United States Patent
Shimura et al.

(10) Patent No.: US 6,843,289 B2
(45) Date of Patent: Jan. 18, 2005

(54) TIRE/WHEEL ASSEMBLY AND RUN-FLAT SUPPORT MEMBER

(75) Inventors: Kazuhiro Shimura, Hiratsuka (JP); Takumi Sekiguchi, Hiratsuka (JP); Mitsuru Naito, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 10/618,729

(22) Filed: Jul. 15, 2003

(65) Prior Publication Data

US 2004/0016490 A1 Jan. 29, 2004

(30) Foreign Application Priority Data

Jul. 26, 2002 (JP) ........................................ 2002-218471

(51) Int. Cl.⁷ .............................................. B60C 17/06
(52) U.S. Cl. ...................... 152/156; 152/158; 152/520
(58) Field of Search ................................ 152/156, 158, 152/520, 248, 249

(56) References Cited

U.S. PATENT DOCUMENTS 6,463,974 B1 * 10/2002 Hellweg et al. ........ 152/520 X
6,463,976 B1 * 10/2002 Glinz et al. .................. 152/520

FOREIGN PATENT DOCUMENTS

| DE | 1 176 013 | * 8/1964 | .................. 152/158 |
| DE | 101 61 365 A1 | * 6/2003 | |
| DE | 102 08 613 C1 | * 6/2003 | |
| JP | 10-297226 A1 | 11/1998 | |
| JP | 2001-163020 A1 | 6/2001 | |
| JP | 2001-519279 A1 | 10/2001 | |

* cited by examiner

Primary Examiner—Adrienne C. Johnstone
(74) Attorney, Agent, or Firm—Rader, Fishman & Grauer PLLC

(57) ABSTRACT

The present invention provides a tire/wheel assembly and a run-flat support member. A pneumatic tire is fitted to a wheel rim; and the run-flat support member constituted of a circular shell and elastic rings is inserted into a cavity of the pneumatic tire, in which the circular shell has a support surface thereof extended toward the periphery of the tire and leg portions along each side of the support surface, and the elastic rings support the leg portions of the circular shell on the rim. In the tire/wheel assembly, the leg portion of the circular shell is formed to have a sidewall extending in a shell radial direction and a bottom wall that is substantially parallel to a shell axial direction. The elastic ring is attached to the sidewall of the leg portion while being abutted on the bottom wall of the same without an engagement.

6 Claims, 4 Drawing Sheets

TIRE/WHEEL ASSEMBLY AND RUN-FLAT SUPPORT MEMBER

BACKGROUND OF THE INVENTION

The present invention relates to a tire/wheel assembly which enables run-flat traveling and to a run-flat support member which is employed in the tire/wheel assembly. More specifically, the present invention relates to a tire/wheel assembly and a run-flat support member which achieves both workability of tire-to-rim fit and durability for run-flat traveling.

To meet the demand from the market, numerous techniques have been proposed to enable a certain degree of emergency driving even when a pneumatic tire is punctured while driving a vehicle. Among those numerous proposals, the techniques proposed in Japanese Patent Laid-Open Publication No. 10-297226 and Published Japanese Translation of a PCT Application No. 2001-519279 enable run-flat traveling by fitting a core to a rim in a cavity of a pneumatic tire assembled to the rim and supporting a flat tire with the core.

The foregoing run-flat core has an open-leg-structured circular shell including a support surface thereof extended toward the periphery of the tire and leg portions along each side of the support surface. The run-flat core is constituted by attaching elastic rings to both of these leg portions so that the core is supported on the rim through the elastic rings. The advantage of the run-flat core is that the available rims and wheels in the market can be used as their own, without any particular modifications. Thus, the core can be accepted to the market without causing difficulties therein.

Nevertheless, the elastic rings of the core are required to be capable of supporting a load in a shell radial direction during run-flat traveling. At the same time, the elastic rings are required to be deformable in a shell axial direction when fitting to a rim or to have a low resistance to that bending deformation. To satisfy the characteristics, providing slits which extend in the shell axial direction in the elastic rings has been proposed. However, since these slits cause an infinitesimal deformation in the shell radial direction in the elastic rings, the slits are a main factor of durability degradation for run-flat traveling. In addition, there has been another problem that durability for run-flat traveling is prone to be degraded when stresses are concentrated on the elastic rings which support the circular shell.

SUMMARY OF THE INVENTION

An object of the present invention is to provide a tire/wheel assembly and a run-flat support member which can achieve both workability of tire-to-rim fit and durability for run-flat traveling.

The tire/wheel assembly of the present invention for achieving the foregoing object is constituted as follows: a pneumatic tire is fitted to a wheel rim; and the run-flat support member constituted of a circular shell and elastic rings is inserted into a cavity of the pneumatic tire, in which the circular shell has a support surface thereof extended toward the periphery of the tire and leg portions along each side of the support surface, and the elastic rings support the leg portions of the circular shell on the rim. The tire/wheel assembly is characterized by that the leg portion of the circular shell is formed to have a sidewall which extends in a shell radial direction and a bottom wall which is substantially parallel to a shell axial direction. The tire/wheel assembly is also characterized by that the elastic ring is attached to the sidewall of the leg portion while being abutted on the bottom wall of the same without an engagement.

Moreover, the run-flat support member of the present invention is constituted of a circular shell and elastic rings, in which the circular shell has a support surface thereof extended toward the periphery of the tire and leg portions along each side of the support surface, and the elastic rings support the leg portions of the circular shell on a wheel rim. The run-flat support member is characterized by that the leg portion of the circular shell is formed to have a sidewall which extends in a shell radial direction and a bottom wall which is substantially parallel to a shell axial direction. The run-flat support member is also characterized by that the elastic ring is attached to the sidewall of the leg portion while being abutted on the bottom wall of the same without an engagement.

In the present invention, the outer diameter of the run-flat support member is formed to be smaller than the inner diameter of a tread of the pneumatic tire so that a constant distance is maintained between the run-flat support member and the pneumatic tire. The inner diameter of the run-flat support member is formed to have substantially the same size as that of the inner diameter of a bead of the pneumatic tire. The run-flat support member as well as the pneumatic tire are fit to the wheel rim while the run-flat support member is inserted into the cavity of the pneumatic tire, thereby constituting the tire/wheel assembly. When the pneumatic tire is punctured while driving a vehicle to which the tire/wheel assembly is attached, the support surface of the circular shell of the run-flat support member supports the punctured flattened tire. Therefore, the run-flat traveling is enabled.

According to the present invention, the leg portion of the circular shell is formed to have the sidewall and the bottom wall, in which the sidewall extends in the shell radial direction, and the bottom wall is substantially parallel to the shell axial direction. The elastic ring is attached to the sidewall of the leg portion while being abutted on the bottom wall of the same without an engagement. Accordingly, the elastic ring has a structure that a portion which is attached to the sidewall of the leg portion is relatively thin and that a portion which is abutted on the bottomwall of the leg portion is relatively thick. As a consequence, the elastic ring is easily deformed in the shell axial direction by making the thin portion as a bending point when the run-flat support member as well as the pneumatic tire are fit to the rim. Therefore, it is possible to improve the workability of tire-to-rim fit.

Meanwhile, the thick portion of the elastic ring supports a load applied in the shell radial direction through the bottom wall on the leg portion of the circular shell during run-flat traveling. Thus, durability can be sufficiently secured for run-flat traveling. Especially, since the bottom wall which is substantially parallel to the shell axial direction is provided in the leg portion of the circular shell, the load is transmitted to the entirety of the elastic ring through the bottom wall which extends in the shell axial direction. Thus, stress concentration on the elastic ring can be avoided, and durability can be enhanced for run-flat traveling.

In the present invention, it is preferable to fold an end portion of the bottom wall in the leg portion of the circular shell toward an outer shell radial direction. As a result, the stability of the elastic ring can be enhanced for run-flat traveling. In addition, it is preferable to make wavy asperities along a shell circumferential direction on a portion of the sidewall in the leg portion of the circular shell, to which the elastic ring is attached. Accordingly, a bonding area between the leg portion of the circular shell and the elastic ring is enlarged, and adhesion can be improved between the two.

BRIEF DESCRIPTION OF THE DRAWINGS

FIG. 6(a) is a sectional view thereof and FIG. 6(b) is a side view thereof.

DETAILED DESCRIPTION OF THE PREFERRED EMBODIMENTS

The present invention is detailed below with reference to the attached drawings.

Figure 1:
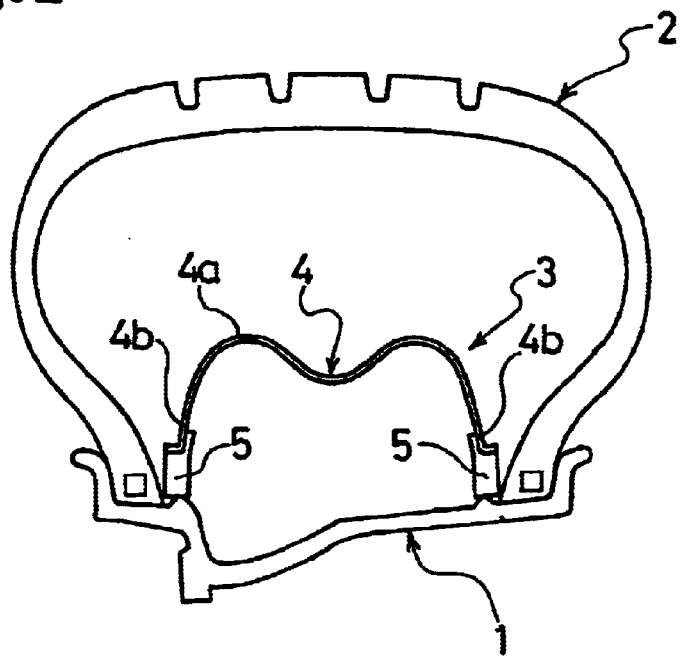
FIG. 1 is a meridian sectional view showing an essential part of a tire/wheel assembly formed in an embodiment of the present invention.

FIG. 1 is a meridian sectional view showing an essential part of a tire/wheel assembly (a wheel) formed in an embodiment of the present invention. Reference numerals 1, 2 and 3 denote a wheel rim, a pneumatic tire and a run-flat support member, respectively. These rim 1, pneumatic tire 2 and run-flat support member 3 are formed in a circle around a wheel rotation axis (not shown).

A circular shell 4 and elastic rings 5 constitute an essential part of the run-flat support member 3. This run-flat support member 3 is spaced from the inner wall of the pneumatic tire 2 under normal driving conditions. When the pneumatic tire 2 is punctured, the run-flat support member 3 supports the flattened pneumatic tire 2 from the inside.

The circular shell 4 has an open leg structure in which a continuous support surface 4a for sustaining the flat tire is extended toward the periphery of the tire (outer radial direction), and leg portions 4b and 4b are provided along each side of the support surface 4a. The support surface 4a of the circular shell 4 is formed so that the support surface 4a has a convexly curved portion toward the periphery of the tire in a cross section orthogonal to the circumferential direction. A minimum of one convexly curved portion is required, but two or more convexly curved portions are preferably aligned in a tire axial direction. In this way, the support surface 4a of the circular shell 4 is formed so that two or more convexly curved portions are aligned. Accordingly, two or more portions in contact with the inner wall of the tire can be distributed on the support surface 4a, and local wear on the inner wall of the tire can be reduced.

Therefore, it is possible to extend a distance which a vehicle endures run-flat traveling.

The foregoing circular shell 4 is made of a rigid material in order to sustain the vehicle weight through the flat pneumatic tire 2, and metal, resin or the like are used for the constituent material. As for the metal, steel and aluminum are exemplified. As for the resin, both thermoplastic resin and thermosetting resin can be used. Examples of thermoplastic resin are nylon, polyester, polyethylene, polypropylene, polystyrene, polyphenylene sulfide and ABS. Examples of thermosetting resin are epoxy resin and unsaturated polyester resin. Resin can be used as single or fiber reinforced resin by containing reinforcing fiber.

The elastic rings 5 are respectively attached to the leg portions 4b and 4b of the circular shell 4 and abutted on bilateral rim seats to support the circular shell 4. These elastic rings 5 alleviate impact and vibration of the circular shell 4 caused by the punctured pneumatic tire 2. The elastic rings 5 also prevent slipping on the rim seats to stably support the circular shell 4.

Rubber or resin can be used as a constituent material of the elastic rings 5, and rubber is more preferable. Examples of rubber types are natural rubber (NR), isoprene rubber (IR), styrene-butadiene rubber (SBR), butadiene rubber (BR), hydrogenated acrylonitrile-butadiene rubber, hydrogenated styrene-butadiene rubber, ethylene propylene rubber (EPDM, EPM), butyl rubber (IIR), acrylic rubber (ACM), chloroprene rubber (CR), silicone rubber and fluoro-rubber. As a matter of course, it is possible for these types of rubber to contain an additive such as filler, vulcanizer, vulcanization accelerator, softener and antioxidant as appropriate. Accordingly, a desired elastic modulus can be obtained based on the compounding ratio of the rubber components.

In the tire/wheel assembly thus constituted, when the pneumatic tire 2 is punctured while driving a vehicle, the support surface 4a of the circular shell 4 of the run-flat support member 3 supports the flattened pneumatic tire 2. Thus, run-flat traveling is enabled.

Figure 2:
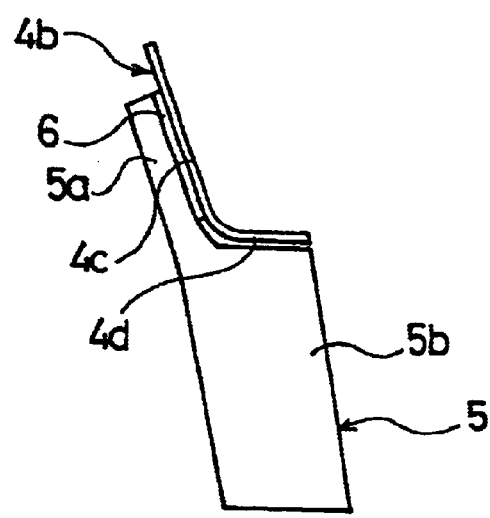
FIG. 2 is a sectional view showing an enlarged joint portion between a circular shell and an elastic ring of the run-flat support member of the present invention.

FIG. 2 shows an essential part of the run-flat support member. As shown in FIG. 2, the inner circumferential side of the leg portion 4b of the circular shell 4 is bent toward a shell axial direction. In this way, the leg portion 4b of the circular shell 4 is formed to have a side wall 4c extending in a shell radial direction and a bottom wall 4d that is substantially parallel to the shell axial direction. Meanwhile, the elastic ring 5 is constituted of a thin-walled portion 5a in an outer circumferential side and a thick-walled portion 5b in an inner circumferential side. The thin-walled portion 5a of the elastic ring 5 is adhered to the sidewall 4c of the leg portion 4b through an adhesive layer 6. However, the thick-walled portion 5b is abutted on the bottom wall 4d of the leg portion 4b without an engagement.

Figure 3:
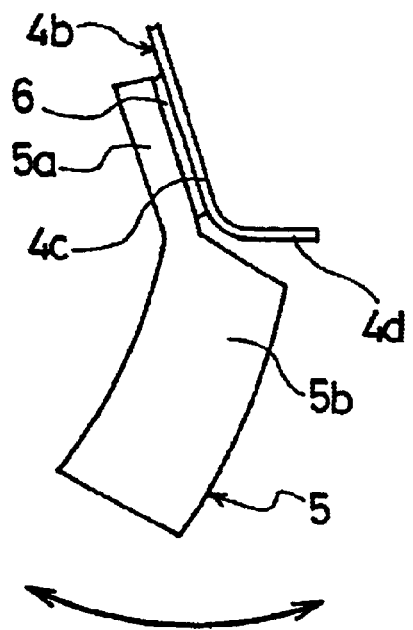
FIG. 3 is a sectional view showing displacement of the elastic ring of the run-flat support member of the present invention when fitting to a rim.

Thus, the sidewall 4c and the bottom wall 4d are formed on the leg portion 4b of the circular shell 4, in which the sidewall 4c extends in the shell radial direction, and the bottom wall 4d is substantially parallel to the shell axial direction. The thin-walled portion 5a of the elastic ring 5 is adhered to the sidewall 4c of the leg portion 4b. Meanwhile, the thick-walled portion 5b of the elastic ring 5 is abutted on the bottom wall 4d of the leg portion 4b without an engagement. Accordingly, when the run-flat support member 3 as well as the pneumatic tire 2 are fit to the rim, the elastic ring 5 is easily deformed in the shell axial direction by bending the thin-walled portion 5a, as shown in FIG. 3. Therefore, the tire/wheel assembly including the run-flat support member 3 has excellent work ability of tire-to-rim fit.

In the mean time, in the state shown in FIG. 2, a load applied in the shell radial direction is supported by the thick-walled portion 5b of the elastic ring 5 through the bottom wall 4d of the leg portion 4b of the circular shell 4 during run-flat traveling. Thus, durability is sufficiently secured for run-flat traveling. Especially, since the bottom wall 4d which is substantially parallel to the shell axial direction is provided in the leg portion 4b of the circular shell 4, the load is transmitted to the entirety of the elastic ring 5 through the bottom wall 4d which extends in the shell axial direction, during run-flat traveling. Therefore, stresses are hardly concentrated on the elastic ring 5, and durability can be improved for run-flat traveling.

Figure 4:
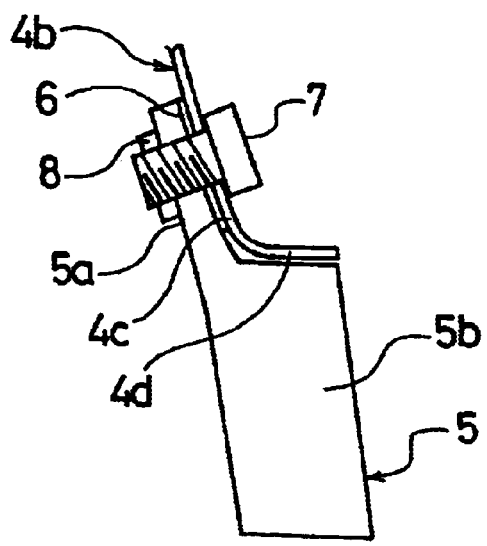
FIG. 4 is a sectional view showing a modification example of the joint portion between the circular shell and the elastic ring of the run-flat support member of the present invention.

FIG. 4 shows a modification example of the preceding run-flat support member. As shown in FIG. 4, a bolt 7 and a nut 8 can be used to join the leg portion 4b of the circular shell 4 and the elastic ring 5. As a matter of course, it is possible to join the leg portion 4b of the circular shell 4 and the elastic ring 5 by only the bolt 7 and the nut 8, without providing the adhesive layer 6.

Figure 5:
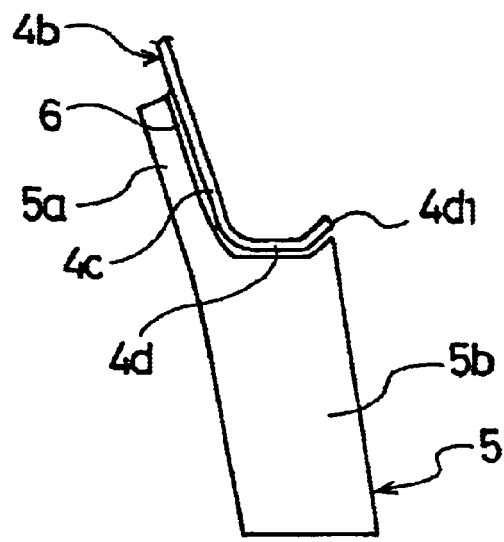
FIG. 5 is a sectional view showing another modification example of the joint portion between the circular shell and the elastic ring of the run-flat support member of the present invention.

FIG. 5 shows another modification example of the run-flat support member. As shown in FIG. 5, an end portion $4d_1$ of the bottom wall 4d on the leg portion 4b of the circular shell 4 can be folded toward the outer radial direction of the shell. In this case, the elastic ring 5 can be highly stable during run-flat traveling. As a consequence, durability can be further improved for run-flat traveling.

Figure 6A:
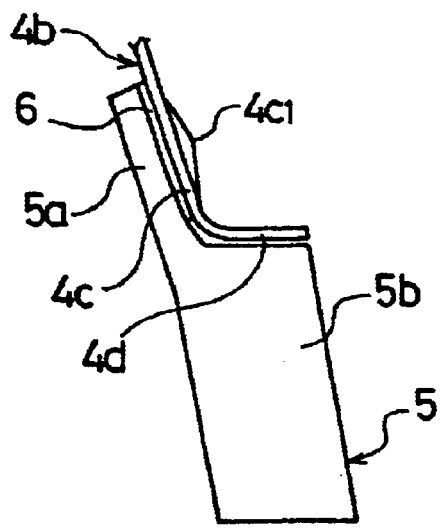
FIGS. 6(a) and 6(b) show still another modification example of the joint portion between the circular shell and the elastic ring of the run-flat support member of the present invention.
Figure 6B:
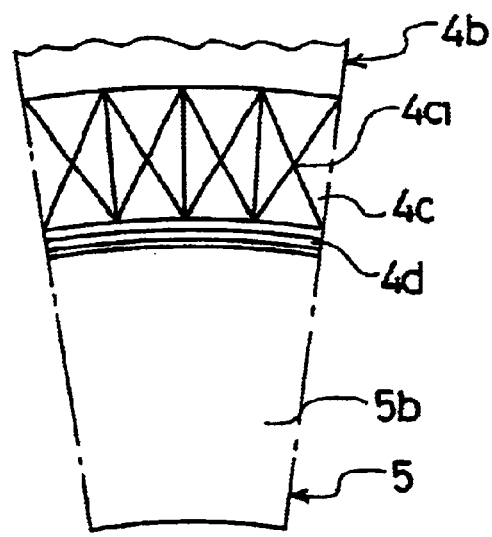

FIGS. 6(a) and 6(b) show still another modification example of the run-flat support member. As shown in FIGS. 6(a) and 6(b), wavy asperities $4c_1$ can be made along the shell circumferential direction on a portion of the side wall 4c in the leg portion 4b of the circular shell 4, which is bonded with the elastic ring 5. In this case, a bonding area between the leg portion 4b of the circular shell 4 and the elastic ring 5 is enlarged, thereby improving adhesion of the two. As a result, durability can be further improved for run-flat traveling. Note that the wavy asperities $4c_1$ can be easily formed by knurling.

EXAMPLE

A tire/wheel assembly having a pneumatic tire with a tire size of 205/55R16 89V and a wheel with a rim size of 16×6 1/2JJ was prepared. In this tire/wheel assembly, a 1.0 mm-thick steel plate was processed to create a circular shell. Then, as shown in FIG. 2, a run-flat support member was created, in which a sidewall and a bottom wall were formed in a leg portion of the circular shell. The sidewall extends in a shell radial direction and the bottom wall is substantially parallel to a shell axial direction. The elastic ring was attached to the sidewall of the leg portion while being abutted on the bottom wall of the same without an engagement. The run-flat support member was inserted into a cavity of the pneumatic tire. Thus, the tire/wheel assembly (example) was created.

Figure 7:
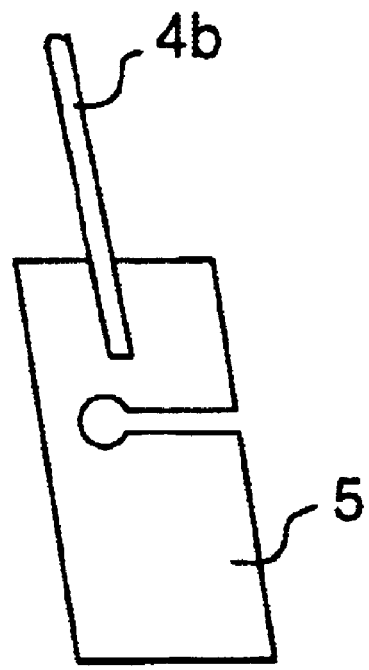
FIG. 7 is a sectional view showing a joint portion between a circular shell and an elastic ring of a conventional run-flat support member.

Furthermore, as shown in FIG. 7, a run-flat support member was created for comparison, in which a leg portion of a circular shell is embedded in an elastic ring having a slit. The tire/wheel assembly (conventional example) having the same structure as that of the example other than employment of the above run-flat support member was thus obtained.

Durability of the two types of the tire/wheel assemblies during run-flat traveling was evaluated by the following measurement method, and the results thereof are listed in Table 1.

[Durability of the Tire during Run-flat Traveling]

A tire/wheel assembly to be tested was fit in the right front wheel of a front engine/rear drive car with an engine capacity of 2.5 liter. Inner pressure of the tire was set to 0 kPa (200 kPa for other tires), and the car was driven counterclockwise at 90 km/h in a circular circuit. A distance that the car was driven was measured until the car became incapable of being driven. The results of evaluation are indicated by index number, where the assembly of the conventional example is set to 100. The larger the index number is, the better the durability during run-flat traveling was.

TABLE 1

|  | Conventional Example | Example |
|---|---|---|
| Structure of Joint Portion between Circular Shell and Elastic Ring | FIG. 7 | FIG. 2 |
| Durability During Run-Flat Traveling | 100 | 110 |

As shown in Table 1, the tire/wheel assembly of the example had better durability than that of the conventional example during run-flat traveling. Moreover, in the tire/wheel assembly of the example, the elastic ring was easily deformed in a shell axial direction when the run-flat support member as well as the pneumatic tire were fit to the rim. Thus, the tire-to-rim fit workability of the tire/wheel assembly of the example was as good as that of the tire/wheel assembly of the conventional example.

According to the present invention, a run-flat support member is constituted of a circular shell and elastic rings, in which the circular shell has a support surface thereof extended toward the periphery of the tire and leg portions along each side of the support surface, and the elastic rings support the leg portions of the circular shell on a rim. In the run-flat support member, the leg portion of the circular shell is formed to have a sidewall extending in a shell radial direction and a bottom wall that is substantially parallel to a shell axial direction. The elastic ring is attached to the sidewall of the leg portion while being abutted on the bottom wall of the same without an engagement. Thus, both workability of tire-to-rim fit and durability for run-flat traveling can be achieved.

Hereinbefore, the preferred embodiments of the present invention have been detailed. It is to be understood that various modifications, variations and changes can be made without departing from the spirit and scope of the present invention defined by the appended claims.

What is claimed is:

1. A tire/wheel assembly, in which a pneumatic tire is fitted to a wheel rim, including:
   a run-flat support member constituted of a circular shell and elastic rings and inserted into a cavity of the pneumatic tire, the circular shell having a support surface thereof extended toward a periphery of the pneumatic tire and leg portions along each side of the support surface, and the elastic rings supporting the leg portions of the circular shell on the rim,
   wherein the leg portion of the circular shell is formed to have a sidewall which extends in a shell radial direction and a bottom wall which is substantially parallel to a shell axial direction, and the elastic ring is attached to the sidewall of the leg portion while being abutted on the bottom wall of the same without an engagement.

2. The tire/wheel assembly according to claim 1, wherein an end portion of the bottom wall in the leg portion of the circular shell is folded toward an outer radial direction of the shell.

3. The tire/wheel assembly according to any one of claim 1 or 2, wherein wavy asperities are made along a shell circumferential direction on a portion of the sidewall in the leg portion of the circular shell, to which the elastic ring is attached.

4. A run-flat support member, comprising:
- a circular shell which has a support surface thereof extended toward a periphery of a pneumatic tire and leg portions along each side of the support surface; and
- elastic rings which support the leg portions of the circular shell on a wheel rim,
- wherein the leg portion of the circular shell is formed to have a sidewall which extends in a shell radial direction and a bottom wall which is substantially parallel to a shell axial direction, and the elastic ring is attached to the sidewall of the leg portion while being abutted on the bottom wall of the same without an engagement.

5. The run-flat support member according to claim 4, wherein an end portion of the bottom wall in the leg portion of the circular shell is folded toward an outer radial direction of the shell.

6. The run-flat support member according any one of claim 4 or 5, wherein wavy asperities are made along a shell circumferential direction on a portion of the sidewall in the leg portion of the circular shell, to which the elastic ring is attached.

* * * * *